US008017068B2

(12) United States Patent
Dengel et al.

(10) Patent No.: US 8,017,068 B2
(45) Date of Patent: *Sep. 13, 2011

(54) INDUCING SWIRL IN A GAS FLOW (75) Inventors: Derek Dengel, Ellwood City, PA (US);
George Cingle, III, Gibsonia, PA (US);
Todd Smith, Grove City, CA (US)

(73) Assignee: Technological Resources Pty. Limited,
Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/956,620

(22) Filed: Dec. 14, 2007

(65) Prior Publication Data
US 2008/0265473 A1 Oct. 30, 2008

Related U.S. Application Data (60) Provisional application No. 60/874,978, filed on Dec. 15, 2006.

(51) Int. Cl.
*C21C 5/32* (2006.01)
*C21C 7/00* (2006.01)
*C21C 1/00* (2006.01)
*C21C 5/00* (2006.01)
(52) U.S. Cl. ......... 266/225; 266/216; 266/217; 266/241
(58) Field of Classification Search .................. 266/216, 266/217, 225, 241
See application file for complete search history.

(56) References Cited

U.S. PATENT DOCUMENTS

| 6,083,296 | A | 7/2000 | Innes et al. |
| 6,440,356 | B2 | 8/2002 | Dunne |
| 6,673,305 | B2 * | 1/2004 | Dunne et al. ............ 266/225 |
| 2003/0164066 | A1 * | 9/2003 | Dry et al. ................ 75/503 |

FOREIGN PATENT DOCUMENTS

| AU | 434455 | 5/1970 |
| WO | WO 03/006693 A1 | 1/2003 |

OTHER PUBLICATIONS

"Properties of Metals" Thermal—Engineers Edge 2000-2009, by Engineers Edge.*
European Search Report issued in European Patent Application No. 07024284.7, dated Jan. 19, 2011.

* cited by examiner

*Primary Examiner* — Jessica L Ward
*Assistant Examiner* — Alexander Polyansky
(74) *Attorney, Agent, or Firm* — Finnegan, Henderson, Farabow, Garrett & Dunner, L.L.P.

(57) ABSTRACT

An apparatus for injecting gas into a metallurgical vessel supporting a metallurgical process is disclosed. The apparatus includes a gas flow duct, an elongate central structure extending within the gas flow duct, and a plurality of flow directing swirl vanes disposed about the central tubular structure adjacent the forward end of the duct. The flow directing vanes are formed with internal water flow passages for flow of cooling water internally along each vane. The elongate central structure is formed with a cooling water supply passage for supply of cooling water to the internal water flow passages in the vanes and a water return passage for outflow of cooling water which has passed through the internal water flow passages in the vanes.

14 Claims, 7 Drawing Sheets

FIGURE 14

INDUCING SWIRL IN A GAS FLOW

CROSS REFERENCE TO RELATED APPLICATION

This application claims the benefit of U.S. Provisional Application No. 60/874,978, filed Dec. 15, 2006, the contents of which are incorporated herein by reference.

The present invention relates to swirl inducers for inducing swirl in gas flows. It has particular, but not exclusive application to apparatus for injecting a flow of gas with swirl into a metallurgical vessel under high temperature conditions. Such metallurgical vessel may for example be a smelting vessel in which molten metal is produced by a direct smelting process.

A known direct smelting process, which relies on a molten metal layer as a reaction medium, and is generally referred to as the HIsmelt process, is described in U.S. Pat. No. 6,083,296. The HIsmelt process as described in that patent comprises:

(a) forming a bath of molten iron and slag in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favorable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. To promote effective post combustion of the gases in the upper part of the vessel, it is desirable that the incoming hot air blast exit the lance with a swirling motion. To achieve this, the outlet end of the lance may be fitted with internal flow guides to impart an appropriate swirling motion. The upper regions of the vessel may reach temperatures of the order of 2000° C. and the hot air may be delivered into the lance at temperatures of the order of 1100-1400° C. The lance must therefore be capable of withstanding extremely high temperatures both internally and on the external walls, particularly at the delivery end of the lance which projects into the combustion zone of the vessel.

U.S. Pat. No. 6,440,356 discloses a gas injection lance construction designed to meet the extreme conditions encountered in the HIsmelt process. In that construction, the flow guides are in the form of spiral vanes mounted on a central body at the forward end of a gas flow duct. Those vanes are connected to the wall of the gas flow duct and are internally water cooled by cooling water which flows through supply and return passages within the wall of the duct. U.S. Pat. No. 6,673,305 discloses an alternative lance construction in which spiral flow guide vanes are mounted on a central tubular structure extending throughout the length of the gas flow duct. The central structure is provided with water flow passages which provide for the flow of cooling water to the front part of the central structure which is located generally within the tip of the gas flow duct. In that construction, the flow guide vanes are not cooled and are set back from the tip of the duct within a refractory lined wall section of the duct.

The present invention provides an improved construction which enables extremely effective cooling of the swirl vanes.

According to the invention there is provided an apparatus for injecting gas into a metallurgical vessel supporting a metallurgical process, comprising a gas flow duct extending from a rear end to a forward end from which to discharge gas from the duct;

an elongate central structure extending within the gas flow duct from its rear end to its forward end; and a plurality of flow directing vanes disposed about the central tubular structure adjacent the forward end of the duct to impart swirl to a gas flow through the forward end of the duct; and wherein the flow directing vanes are formed with internal water flow passages for flow of cooling water internally along each vane and the elongate central structure is formed with a cooling water supply passage for supply of cooling water to the internal water flow passages in the vanes and a water return passage for outflow of cooling water which has passed through the internal water flow passages in the vanes.

Each vane may have a series of said internal water flow passages extending along the vane and spaced successively from the root of the vane toward its tip.

The flow passages of each vane may have end portions connected to water inlets and outlets disposed with end parts of the vane and spaced longitudinally of the vane.

Each of the flow passages of the vanes may have a constant cross-section for flow throughout its length.

All of the flow passages of each vane may have the same flow cross-section.

The water outlets may be individually sized to substantially equalise the resistance to flow through all of the internal water flow passages.

The vanes may be formed by being cast in metal about individually formed tubes providing the internal water flow passages within the vanes.

The vanes may be cast of copper and the tubes may also be made of copper.

The cast vanes may be externally electroplated with a hard metal coating, for example of nickel.

The invention also provides a direct smelting vessel that is fitted with the above-described apparatus for injecting gas into the vessel.

The invention also provides a gas swirl inducer for mounting in a gas flow duct for imparting swirl to gas flowing therethrough, comprising a central elongate portion and a plurality of swirl vanes disposed about and extending along the central portion, wherein the swirl vanes are formed with internal water flow passages for flow of cooling water internally along each vane, each vane having a series of said internal water flow passages extending along the vane at successively increasing outwards spacing from the root of the vane toward its tip.

The internal water flow passages of each vane may have radial end portions connected to water inlets and outlets disposed within end parts of the vane and spaced longitudinally of the vane.

The invention also extends to a device for imparting swirl to a stream of preheated gas in a lance for supply of such gas to a vessel, said device comprising an elongate tubular structure;

a plurality of flow directing vanes disposed about the central tubular structure adjacent a forward end of that structure; and cooling water passages within the tubular structure for flow of cooling water through that structure from a rear end to its forward end to internally cool the forward end and to then return back through the tubular structure to its rear end, said cooling water passages comprising a central water flow passage for flow of water into the forward end of the tubular structure and an annular water flow passage disposed about the central passage for return flow of water from the forward end of the tubular structure back toward the rear end of that structure; and wherein the flow directing vanes are formed with internal water flow passages for flow of cooling water internally along each vane and communicating with the cooling water passages in the tubular structure.

The invention also extends to a direct smelting vessel that is fitted with a lance for supply of gas into the vessel and the above-described device for imparting swirl into a stream of the gas.

In order that the invention may be more fully explained one particular embodiment will be described in detail with reference to the accompanying drawings in which.

Figure 1:
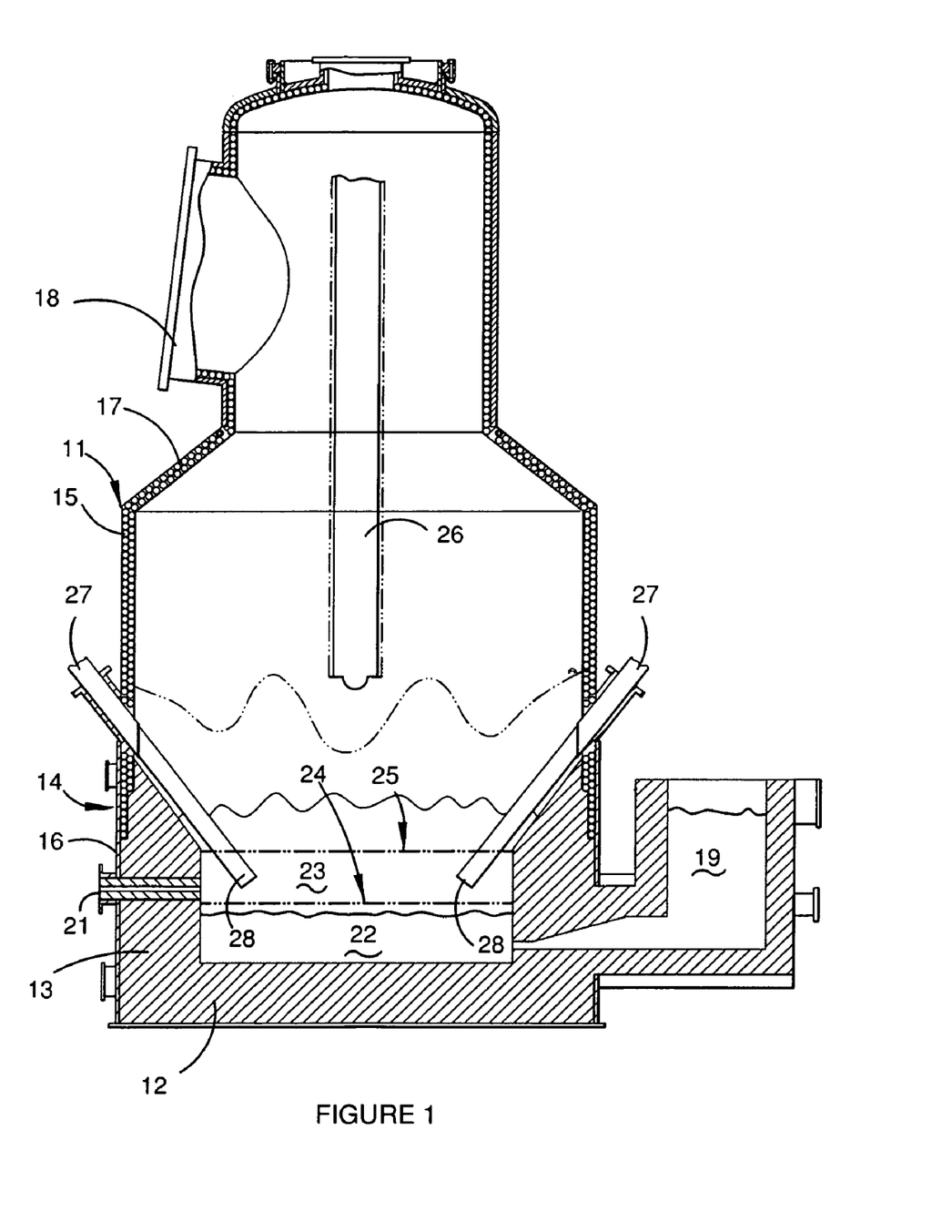
FIG. 1 is a vertical section through a direct smelting vessel incorporating a pair of solids injection lances and a hot air blast injection lance constructed in accordance with the invention.

FIG. 1 illustrates a direct smelting vessel suitable for operation by HIsmelt process as described in U.S. Pat. No. 6,083,296. The metallurgical vessel is denoted generally as 11 and has a hearth that includes a base 12 and sides 13 formed from refractory bricks; side walls 14 which form a generally cylindrical barrel extending upwardly from the sides 13 of the hearth and which includes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a flow of air heated at a temperature in the order of 1200° C., so called "hot air blast" (or HAB) into an upper region of the vessel and two solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

The construction of the hot air injection lance 26 is illustrated in FIGS. 2-14. As shown in these figures, lance 26 comprises an elongate duct 31 which receives hot gas through a gas inlet structure 32 and injects it into the upper region of vessel. The lance includes an elongate central tubular structure 33 which extends within the gas flow duct 31 from its rear end to its forward end. Adjacent the forward end of the duct, central structure 33 carries a series of four swirl imparting vanes 34 for imparting swirl to the gas flow exiting the duct. The forward end of central structure 33 has a domed nose 35 which projects forwardly beyond the tip 36 of duct 31 so that the forward end of the central body and the duct tip co-act together to form an annular nozzle for divergent flow of gas from the duct with swirl imparted by the vanes 34. Vanes 34 are disposed in a four-start helical formation and are a sliding fit within the forward end of the duct.

Figure 2:
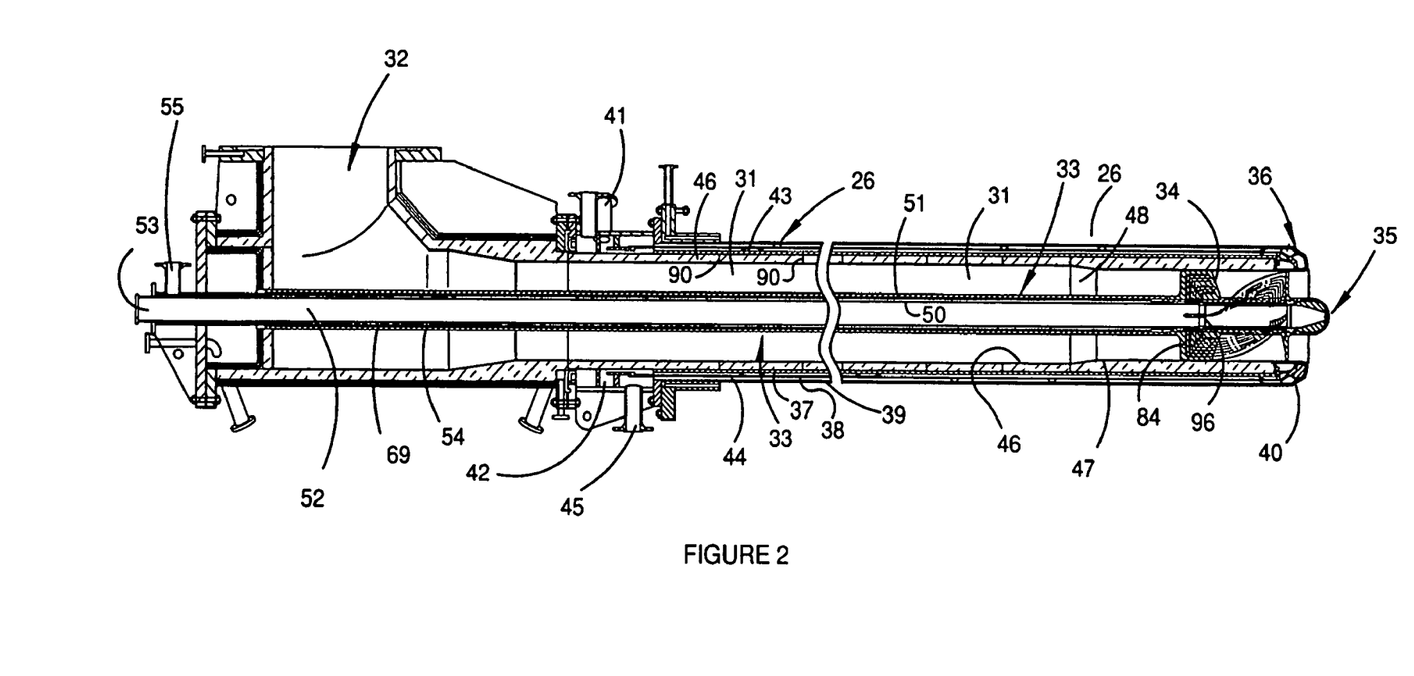
FIG. 2 is a longitudinal cross-section through the hot air injection lance.

The wall of the main part of duct 31 extending downstream from the gas inlet 32 is internally water cooled. This section of the duct is comprised of a series of three concentric steel tubes 37, 38, 39 extending to the forward end part of the duct where they are connected to the duct tip 36. The duct tip 36 is of hollow annular formation and it is internally water cooled by cooling water supplied and returned through passages in the wall of duct 31. Specifically, cooling water is supplied through an inlet 41 and annular inlet manifold 42 into an inner annular water flow passage 43 defined between the tubes 37, 38 of the duct through to the hollow interior of the duct tip 36 through circumferentially spaced openings in the tip. Water is returned from the tip through circumferentially spaced openings into an outer annular water return flow passage 44 defined between the tubes 38, 39 and backwardly to a water outlet 45 at the rear end of the water cooled section of duct 31.

The water cooled section of duct 31 is internally lined with a refractory lining 46 that fits within the innermost metal tube 37 of the duct. The inner periphery of duct tip 36 is generally flush with the inner surface of the refractory lining which defines the effective flow passage for gas through the duct. The forward end of the refractory lining has a slightly reduced diameter section 47 which receives the swirl vanes 34 with a snug sliding fit. Rearwardly from section 47 the refractory lining is of slightly greater diameter to enable the central structure 33 to be inserted downwardly through the duct on assembly of the lance until the swirl vanes 34 reach the forward end of the duct where they are guided into snug engagement with refractory section 47 by a tapered refractory land 48 which locates and guides the vanes into the refractory section 47.

The front end of central structure 33 which carries the swirl vanes 34 is internally water cooled by cooling water supplied forwardly through the central structure from the rear end to the forward end of the lance and then returned back along the central structure to the rear end of the lance. This enables a very strong flow of cooling water directly to the forward end of the central structure and to the domed nose 35 in particular which is subjected to very high heat flux in operation of the lance. A part of the flow of cooling water is also caused to flow through internal water flow passages in the swirl vanes 34 so that the swirl vanes also are internally water cooled.

Central structure 33 comprises inner and outer concentric steel tubes 50, 51 formed by tube segments disposed end to end and welded together. As will be described in more detail with reference to FIGS. 10 to 14 the tube segments 50A and 51A forming the forward ends of tubes 50, 51 are incorporated into a swirl inducer structure 60 comprising the swirl vanes 34. Inner tube 50 defines a central water flow passage— through which water flows forwardly through the central structure from a water inlet 53 at the rear end of the lance and an annular water return passage 54 is defined between the two tubes 50, 51 through which the cooling water returns back through the central structure to a water outlet 55 at the rear end of the lance.

Figure 3:
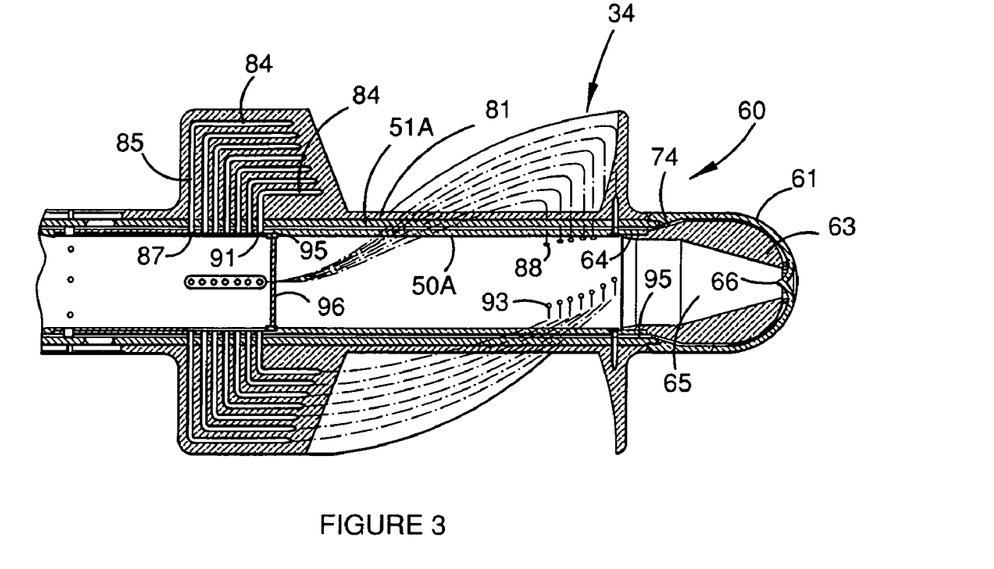
FIG. 3 is a longitudinal cross-section to an enlarged scale through a front part of a central structure of the lance.
Figure 4:
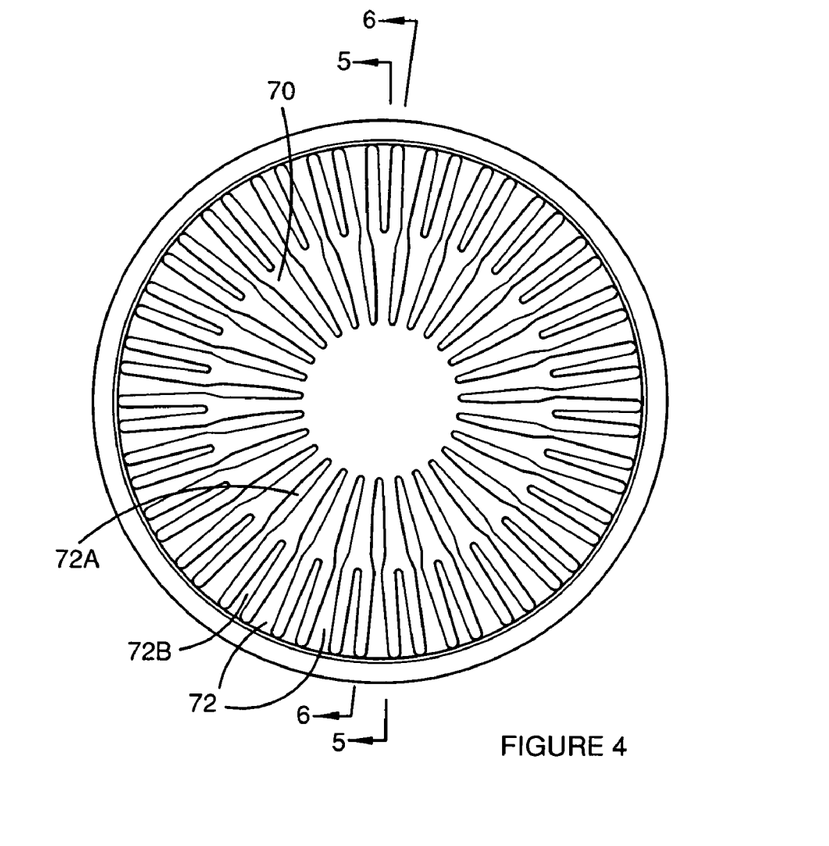
FIG. 4 illustrates a domed outer shell of a nose portion of the central structure.
Figure 5:
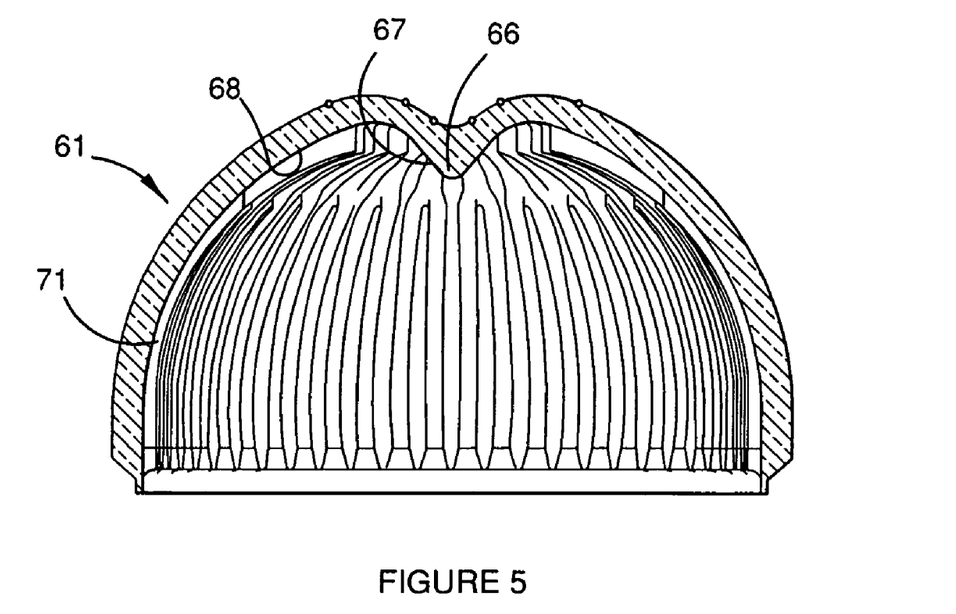
FIG. 5 is a cross-section on the line 5-5 in FIG. 4.
Figure 6:
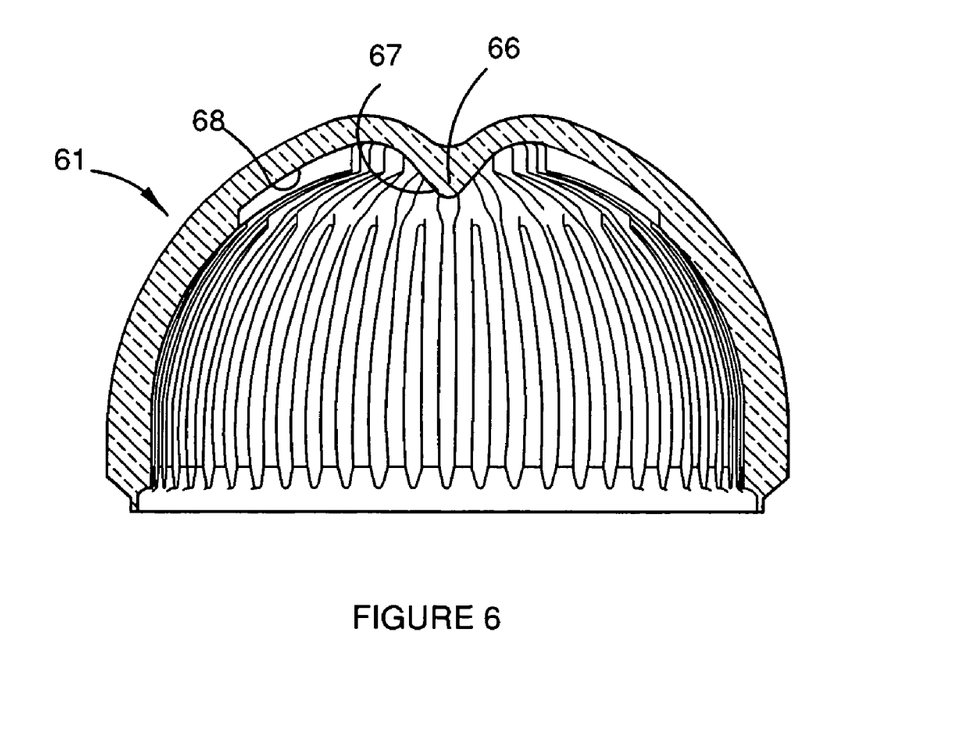
FIG. 6 is a cross-section on the line 6-6 in FIG. 4.
Figure 7:
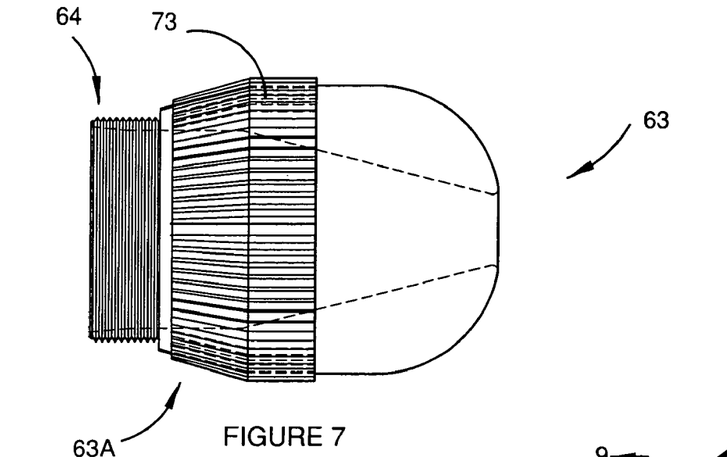
FIG. 7 is a side view of an inner component disposed within the domed outer shell at the front end of the central structure.
Figure 8:
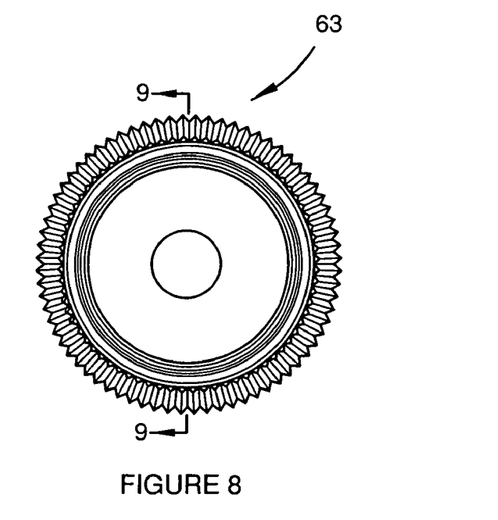
FIG. 8 is an end view of the component illustrated in FIG. 7.
Figure 9:
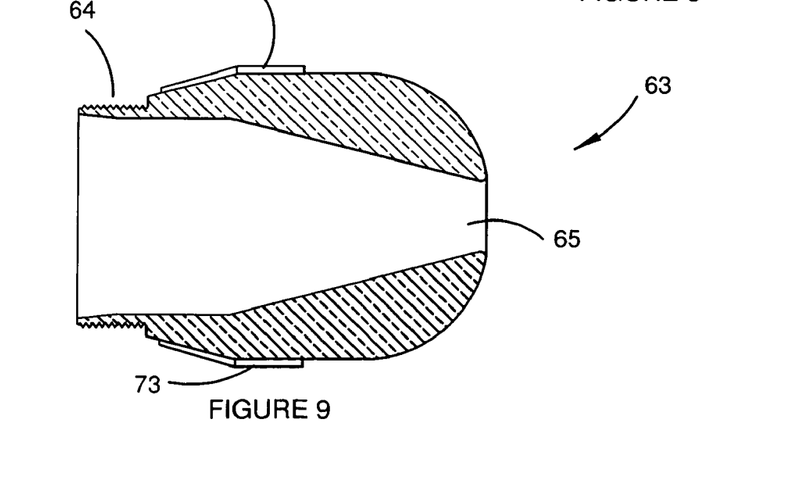
FIG. 9 is a cross-section on the line 9-9 in FIG. 8.

The nose end 35 of central structure 33 comprises a domed outer shell 61 formed of copper in two pieces 61A, 61B which are welded together at 62 and an inner component 63 also formed of copper and screw fitted at 64 into the forward end of tube segment 50A of the inner tube 50 of central structure 33. The inner component 63 is formed with an internal convergent nozzle 65 to receive water from the forward part of central water flow passage 52 and to direct that water in a jet centrally against the inner surface of the outer shell 61 to produce an outwardly and backwardly fanning flow of water around the inner surface of that outer shell.

The central part of the domed outer shell 61 is formed with an inwardly directed conical protuberance 66 aligned with the nozzle 65 so that water directed from the nozzle will impact against the tapering side wall 67 of the protuberance at an acute angle so as to flow outwardly along that sloping surface 67 onto the domed inner surface 68 of the outer shell.

A space 71 between the domed outer shell 61 and the inner component 63 is subdivided by ribs 72 formed on the internal surface of the domed outer shell. Ribs 72 include a first series of ribs 72A radiating outwardly and backwardly from the protuberance formed in the central part of the outer shell and a second series of ribs 72B spaced backwardly from the central part of the outer shell and spaced between the ribs 72A of the first series so as to subdivide the water flow passages 70 into a greater number of discrete passages as those passages diverge outwardly and backwardly along the inner shell.

The rear end part 63A of inner component 63 is provided with circumferentially spaced longitudinal ribs 73 to subdivide a space 74 between that rear end part of the inner component and the rear part 61B of the outer shell into discrete water flow passages 75 for return of water into the outer annular passage 54 of the central structure 33. The number of ribs 73 on the rear end of the inner component exceeds the number of ribs 72 on the inner surface of the outer shell so as to further subdivide the flow of cooling water as it flows back to the annular return passage 54. There may for example be fifty four ribs 72 (27 short and 27 long) and seventy two of the ribs 73.

The outwardly fanning flow of cooling water around the inner surface of the outer shell and the subdivision of that flow into a large number of discrete water flow passages closely spaced around the nose ensures efficient heat extraction and avoids the development of "hot spots" on the nose. The illustrated construction allows formation of a large number of closely spaced identical water flow passages to ensure equal flows of water around the whole circumference of the nose end of the central structure without a development of preferential water flows which could lead to "hot spots".

Figure 10:
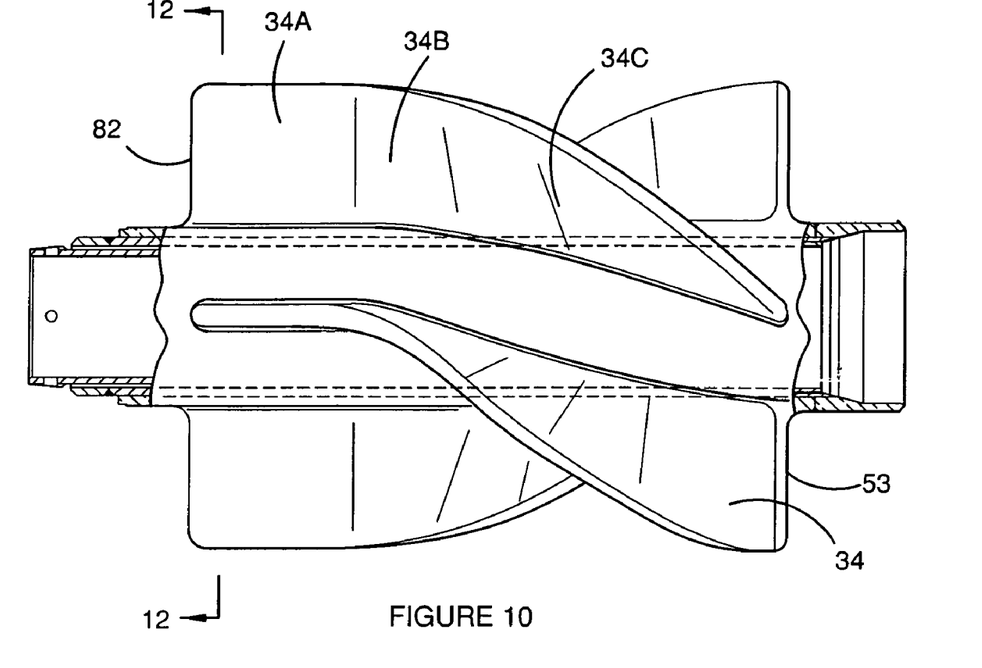
FIG. 10 is a partly sectioned elevation of a swirl inducer incorporated in the central structure.
Figure 11:
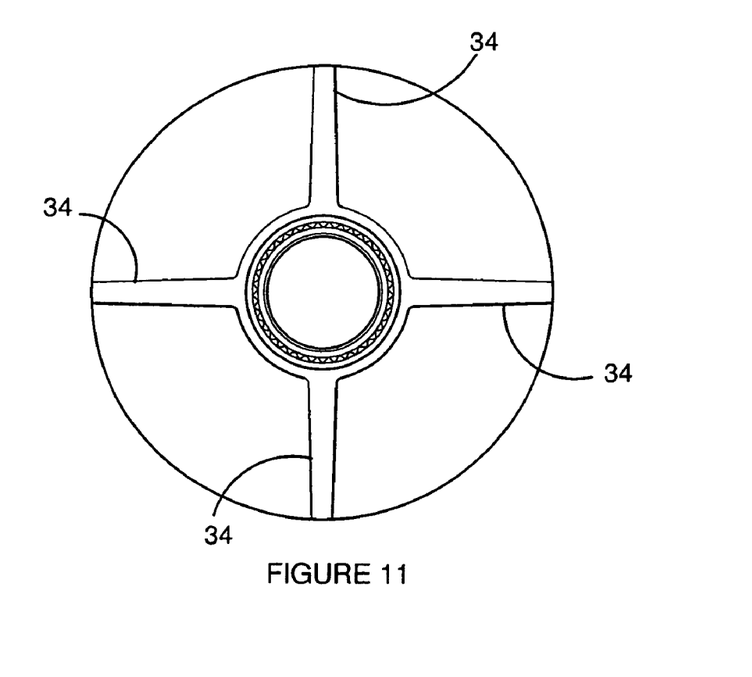
FIG. 11 is an end view of the swirl inducer shown in FIG. 10.
Figure 12:
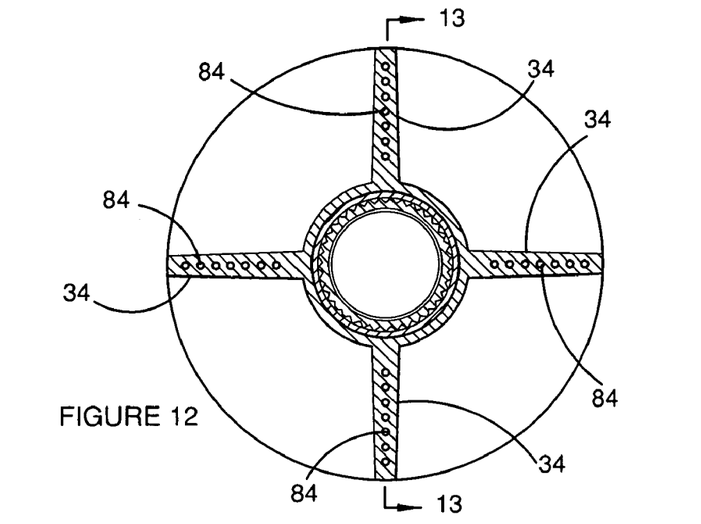
FIG. 12 is a cross-section on the line 12-12 in FIG. 10.

The construction of the swirl inducer 60 is shown in FIGS. 3 and 10 to 14. As shown in those figures the swirl inducer 60 has four vanes 34 that are formed integrally with a central tubular portion 81 fitted over the concentric inner and outer tube parts 50A, 51A forming the forward end of the central structure 33. Swirl vanes 34 have substantially straight leading end portions 34A that radiate outwardly from and extend longitudinally of the central tubular body 81. Helical trailing end portions 34C extending helically about the central tubular body 81 and transition portions 34B joining the leading end portions 34A to the trailing end portions 34C and shaped so as to merge smoothly with both the leading end portions 34A and the trailing end portions 34C and to smoothly and progressively change shape between them. Vanes 34 taper in thickness so as to reduce in thickness in the radially outward direction and to have a trapezoidal cross-section as seen in FIGS. 11 and 12. Each vane rotates through an angle of 90 degrees between its leading edge 82 and its trailing edge 83.

Swirl vanes 34 are formed with internal water flow passages 84 for flow of cooling water internally along each vane. Each vane 34 has a series of seven internal water flow passages 84 extending along the vane at successively increasing outwards spacing from the route of the vane toward its tip. The internal water flow passages 84 have radial end portions 85, 86 which are connected to water inlets 87 and water outlets 88 disposed within the end parts of the vanes and spaced longitudinally of the vanes. More specifically the water inlets are spaced longitudinally along the straight leading ends of the vanes and therefore longitudinally along the central structure 33 whereas the water outlets 88 extend longitudinally along the trailing ends of the vanes and are therefore inclined to the longitudinal direction along the central structure. The internal water flow passages 84 are formed by a series of individually formed copper tubes 89 about which the vanes 34 and central tubular boss 81 are cast in a solid copper structure.

The tubes 89 may all be of the same diameter so as to have the same cross-section for flows. In that case the water outlets may have variable flow cross-sections as described below in order to match the resistance to flow and the pressure drops through all of the water flow passages of differing lengths. Alternatively, it would be possible to use tubes of differing diameters to vary the flow cross-sections of the passages according to their length.

Figures 13, 14:
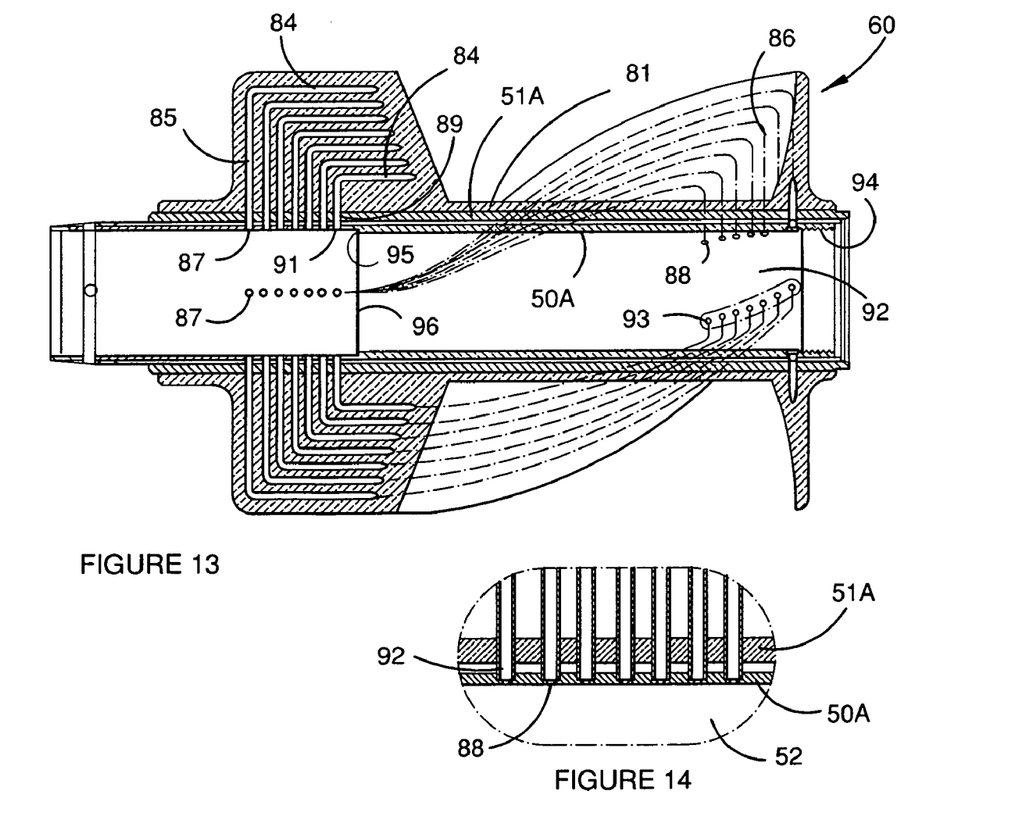
FIG. 13 is a cross-section on the line 13-13 in FIG. 12.
FIG. 14 is a cross-sectional detail of a series of water outlets in the swirl inducer.

Ends 91 of the tubes 89 providing the internal water flow passages 84 within the leading ends of the vanes extend radially inwards through both of the concentric tubes 51A and 50A so as to provide the water inlets for flow of water from the central water flow passage 52 radially outwardly into the internal water flow passages 84 and along the vanes. End portions 92 of the tubes at the trailing end of the vanes project inwardly through the outer most central tube 51A and into blind holes or recesses 93 in the outer surface of the innermost tube 50A. Holes are drilled through the wall of the inner tube and into the ends of the tubes 92 to form the water outlets for flow of water from the passages 84 back into the central water supply passage 52 in the central structure. These holes are drilled at varying sizes so as to equalize the resistance to water flow through the passages 84 which are of significantly varying length. Specifically the outlet holes are drilled so that the outlets have progressively increasing size for the progressively outwardly spaced passages 84 so as to match the resistance to flow and the pressure drop through all of the water flow passages of differing lengths.

The inner tube 50A of the swirl inducer is stopped at 95 and fitted with a disc 96 which obstructs the central passage 52 downstream of the vane inlets 87 to direct inflowing water into the vane passages 84. The diverted water passes along passages 84 to the outlets 88 through which it flows into the forward part of the central passage 52 downstream of the obstruction for delivery to the nose portion of the central structure.

Disc 96 may completely block the central passage 52 so that all of the inflowing water is diverted through vane passages 84. Alternatively it could be perforated to provide only a partial obstruction so that some of the inflowing water is diverted through the vane passages 84 and some passes directly along the central passage 52 to the nose portion of the central structure 33.

In order to form the swirl inducer 60 the preformed copper tubes 91 are fitted to the inner and outer tubes 50A, 51A and the solid copper vanes 34 and boss and central boss 81 are then cast around them. The forward end of tube 50A is internally screw threaded at 94 to receive the screw threaded rear end of nose end 35 of central structure 33 and the rear ends of tubes 50A and 51A are welded to the other tube segments forming the concentric steel tubes 50, 51 of the central structure.

The illustrated swirl inducer 60 allows a flow of water to be diverted from the water flowing along the central supply passage 52 and into the internal water flow passages 84 in the swirl vanes 34. The diverted water flows internally along the swirl vanes to exit passages 84 through the outlets 88 back into the central passage from which it passes through the nose end portion 35 in the manner already described to flow back through the annular water return passage 54 to the water outlet 55 at the rear end of the lance. The tuning of the outlet of the water outlets 88 according to the length of the water flow passages 84 ensures equal pressure drops across all of the water passages promote very even and effective cooling of the swirl vanes.

The illustrated construction 52 ensures that an effective water flow is maintained not only through the vanes but also through the nose end 35 of the lance.

The invention claimed is:

1. An apparatus for injecting gas into a metallurgical vessel supporting a metallurgical process, the apparatus comprising:
   a gas flow duct extending from a rear end to a forward end from which to discharge gas from the duct;
   an elongate central tubular structure extending within the gas flow duct from the rear end of the duct to the forward end of the duct; and
   a plurality of flow directing vanes disposed about the central tubular structure adjacent the forward end of the duct to impart swirl to a gas flow through the forward end of the duct; and
   wherein the flow directing vanes are each formed with a plurality of internal water flow passages for flow of cooling water internally along each vane, the internal water flow passages each extending along the respective vane, and the flow passages in each vane being spaced successively from a root of the vane outwardly toward a tip of the vane to define separate paths for flow of cooling water through the respective vane; and
   wherein the elongate central structure is formed with a cooling water supply passage for supply of cooling water to the internal water flow passages in the vanes and a water return passage for outflow of cooling water which has passed through the internal water flow passages in the vanes.

2. The apparatus defined in claim 1, further comprising a plurality of water inlets located at one of the leading and trailing ends of the vanes, and a plurality of water outlets located at the other of the trailing and leading ends of the vanes,
   wherein each internal water flow passage of each vane has end portions, each of the plurality of inlets is connected to the end portion of a respective one of the internal water flow passages, each of the plurality of outlets is connected to a respective one of the inlets, with each of the inlets and outlets spaced longitudinally along the vane.

3. The apparatus defined in claim 2 wherein each of the flow passages of the vanes has a constant cross-section for flow throughout its length.

4. The apparatus defined in claim 2 wherein all of the flow passages of each vane have the same flow cross-section.

5. The apparatus defined in claim 2, wherein each of the flow passages has a predetermined flow rate, and the respective water outlet is sized to limit flow through the respective flow passage to the predetermined flow rate.

6. The apparatus defined in claim 1 wherein the vanes are formed by being cast in metal about individually formed tubes providing the internal water flow passages within the vanes.

7. The apparatus defined in claim 6 wherein the vanes are cast of copper and the tubes are also made of copper.

8. The apparatus defined in claim 7 wherein the cast vanes are externally electroplated with a hard metal coating.

9. A direct smelting vessel that is fitted with the apparatus for injecting gas into the vessel defined in claim 1.

10. The apparatus defined in claim 5, wherein the water outlets are sized to provide equal resistance to flow through all of the internal water flow passages.

11. The apparatus defined in claim 2, wherein, in the plurality of internal water flow passages in each vane, the internal flow passage closest to the root has the shortest flow path, and the internal flow passage closest to the tip has the longest flow path.

12. The apparatus defined in claim 8, wherein the hard metal coating includes nickel.

13. An apparatus for injecting gas into a metallurgical vessel supporting a metallurgical process, the apparatus comprising:
   a gas flow duct extending from a rear end to a forward end from which to discharge gas from the duct;
   an elongate central tubular structure extending within the gas flow duct from the rear end to the forward end of the duct; and
   a plurality of flow directing vanes disposed about the central tubular structure adjacent the forward end of the duct to impart swirl to a gas flow through the forward end of the duct; and
   wherein the flow directing vanes are each formed with a plurality of internal water flow passages that each extend along the respective vane, and the flow passages in each vane being spaced successively from the root of the vane outwardly toward the tip of the vane to provide parallel flow of cooling water through the respective vane; and wherein the elongate central structure is formed with a cooling water supply passage for supply of cooling water to the internal water flow passages in the vanes and a water return passage for outflow of cooling water which has passed through the internal water flow passages in the vanes.

14. An apparatus for injecting gas into a metallurgical vessel supporting a metallurgical process, the apparatus comprising:

- a gas flow duct extending from a rear end to a forward end from which to discharge gas from the duct;
- an elongate central structure extending within the gas flow duct from the rear end to the forward end of the duct; and
- a plurality of flow directing vanes disposed about the central tubular structure adjacent the forward end of the duct to impart swirl to a gas flow through the forward end of the duct; and
- wherein the flow directing vanes are each formed with a series of internal water flow passages for flow of cooling water internally along each vane, said series extending along the vane with the flow passages in each respective series being spaced successively from the root of the vane outwardly toward the tip of the vane; and
- wherein the elongate central tubular structure is formed with a cooling water supply passage for supply of cooling water to the internal water flow passages in the vanes and a water return passage for outflow of cooling water which has passed through the internal water flow passages in the vanes; and
- wherein the flow passages of each vane have end portions connected to water inlets and outlets that are disposed adjacent end parts of the vane, with each of the inlets and outlets spaced longitudinally along the vane; and
- in the series in each vane, the internal flow passage closest to the root has the shortest flow path, and the internal flow passage closest to the tip has the longest flow path.

* * * * *